(12) United States Patent
Zeort

(10) Patent No.: US 8,645,922 B2
(45) Date of Patent: Feb. 4, 2014

(54) SYSTEM AND METHOD OF IMPLEMENTING A CONCURRENCY PROFILER

(75) Inventor: Samir A. Zeort, Walldorf (DE)

(73) Assignee: SAP AG, Walldorf (DE)

(*) Notice: Subject to any disclaimer, the term of this patent is extended or adjusted under 35 U.S.C. 154(b) by 1260 days.

(21) Appl. No.: 12/277,612

(22) Filed: Nov. 25, 2008

(65) Prior Publication Data
US 2010/0131945 A1    May 27, 2010

(51) Int. Cl.
G06F 9/44 (2006.01)
G06F 15/16 (2006.01)
G06F 11/00 (2006.01)

(52) U.S. Cl.
USPC ........... 717/130; 717/124; 709/203; 714/38.1

(58) Field of Classification Search
USPC ............. 717/124–135; 709/201–203; 714/37, 714/38.1
See application file for complete search history.

(56) References Cited

U.S. PATENT DOCUMENTS

| | | | |
|---|---|---|---|
| 5,668,995 A | 9/1997 | Bhat | |
| 5,819,066 A * | 10/1998 | Bromberg et al. | 707/827 |
| 5,832,484 A * | 11/1998 | Sankaran et al. | 1/1 |
| 5,918,004 A * | 6/1999 | Anderson et al. | 714/38.13 |
| 5,966,509 A * | 10/1999 | Abe et al. | 714/4.12 |
| 6,434,613 B1 | 8/2002 | Bertram | |
| 6,449,739 B1 * | 9/2002 | Landan | 714/47.2 |
| 6,470,464 B2 * | 10/2002 | Bertram et al. | 714/37 |
| 6,557,035 B1 * | 4/2003 | McKnight | 709/224 |
| 6,792,460 B2 * | 9/2004 | Oulu et al. | 709/224 |
| 6,816,874 B1 | 11/2004 | Cotner | |
| 7,367,025 B1 * | 4/2008 | Nikolov et al. | 717/158 |
| 7,401,143 B2 * | 7/2008 | Oulu et al. | 709/224 |
| 7,707,557 B1 * | 4/2010 | Nikolov | 717/130 |
| 7,822,844 B2 * | 10/2010 | Oulu et al. | 709/224 |
| 8,225,291 B2 * | 7/2012 | Chung et al. | 717/125 |
| 2002/0133757 A1 * | 9/2002 | Bertram et al. | 714/47 |
| 2002/0165892 A1 | 11/2002 | Grumann | |
| 2003/0014552 A1 * | 1/2003 | Vaitheeswaran et al. | 709/312 |
| 2003/0114949 A1 | 6/2003 | Armstrong | |
| 2003/0212987 A1 * | 11/2003 | Demuth et al. | 717/130 |

(Continued)

OTHER PUBLICATIONS

Kounev, Samuel, "J2EE Performance: From Benchmarking to Sizing and Capacity Planning," May 2002, Technical University of Darmstadt & Standard Performance Evaluation Corp., p. 1-20.*

(Continued)

*Primary Examiner* — Qing Chen
(74) *Attorney, Agent, or Firm* — Fountainhead Law Group PC

(57) ABSTRACT

In one embodiment the present invention includes a computer-implemented method of measuring bottlenecks in a computer program implemented in a hardware client-server environment. The method includes defining an execution parameter to measure of the hardware client-server environment. The method further includes modifying code blocks to include instrumentation code. The instrumentation code relates to the execution parameter. The method further includes executing, in the hardware client-server environment, the code blocks having been modified. The method further includes generating instrumentation data, related to the execution parameter, that result from executing the code blocks. The method further includes outputting the instrumentation data having been generated. In this manner, the bottlenecks may be measured; the measured bottlenecks may be sorted; noteworthy bottlenecks may be identified; and the aspects of the hardware client-server environment may be adjusted to address the bottlenecks. Sorting is helpful because thousands of synchronization points may be detected and measured, but many of them do not represent a problem that requires correction.

20 Claims, 7 Drawing Sheets

(56) References Cited

U.S. PATENT DOCUMENTS

| | | | |
|---|---|---|---|
| 2003/0225917 A1* | 12/2003 | Partamian et al. | 709/310 |
| 2004/0068560 A1* | 4/2004 | Oulu et al. | 709/224 |
| 2004/0148152 A1* | 7/2004 | Horikawa | 703/22 |
| 2004/0215762 A1* | 10/2004 | Oulu et al. | 709/223 |
| 2004/0215768 A1* | 10/2004 | Oulu et al. | 709/224 |
| 2005/0039186 A1 | 2/2005 | Borkan | |
| 2005/0273783 A1 | 12/2005 | Tankov et al. | |
| 2006/0031388 A1 | 2/2006 | Tankov et al. | |
| 2006/0074970 A1 | 4/2006 | Narayanan | |
| 2006/0106926 A1* | 5/2006 | Kato et al. | 709/223 |
| 2006/0190596 A1 | 8/2006 | Horikawa | |
| 2006/0224706 A1* | 10/2006 | Kudo et al. | 709/220 |
| 2006/0265704 A1* | 11/2006 | Holt | 717/169 |
| 2007/0011667 A1* | 1/2007 | Subbiah et al. | 717/148 |
| 2007/0061289 A1 | 3/2007 | Brown | |
| 2007/0169055 A1* | 7/2007 | Greifeneder | 717/158 |
| 2008/0244583 A1 | 10/2008 | Horikawa | |
| 2009/0177642 A1* | 7/2009 | Chung et al. | 707/5 |

OTHER PUBLICATIONS

Harfoush et al., "Measuring Bottleneck Bandwidth of Targeted Path Segments," 2003, IEEE, p. 2079-2089.*

Kounev, Samuel, "J2EE Performance and Scalability—From Measuring to Predicting," Jan. 23, 2006, SPEC Benchmark Workshop, p. 1-12.*

"SPECjAppServer2004 Frequently Asked Questions, Version 1.02," Mar. 7, 2006, p. 1-11.*

"SPECjAppServer2004 Run and Reporting Rules, Version 1.08," Dec. 14, 2006, p. 1-32.*

European Search Report (from a corresponding foreign application), EP 09008085.4, mailed Nov. 9, 2009.

D. Petriu, C. Shousha, A. Jalnapurkar, "Architecture-based Performance Analysis applied to a Telecommunication System," Software Engineering, IEEE Transactions; Nov. 2000, vol. 26, pp. 1049-1065.

G. Franks, D. Petriu, M. Woodside, Jing Xu, "Quantitative Evaluation of Systems, 2006, QEST 2006." Third International Conference, 2006, pp. 103-114.

A.J. Goldberg, J.L. Hennessy, "Mtool: an Integrated System for Performing Debugging Shared Memory Multiprocessor Applicaitons," Parallel and Distributed Systems, IEEE Transactions Jan. 1993; vol. 4, No. 1, pp. 28-40.

Office Action (from a corresponding foreign application), EP 09008085.4, mailed 2011-10-191.

Douglas J. Brear, Thibaut Weise, Tim Wiffen, Kwok Cheung Yeung, Sara A.M. Bennett and Paul H.J. Kelly. "Search Strategies for Java Bottleneck Location by Dynamic Instrumentation." UK Performance Engineering Workshop (UKPEW 2003), Warwick, UK (Jul. 2003).

Optimizeit Profiler User's Guide: Getting Started. http://techpubs.borland.com/optimizeit/optimizeit6/profiler/getting_started.html. Oct. 14, 2008.

Java Applications—How to Find Bottlenecks. http://jb2works.com/performance/bottleneck.html. Sep. 29, 2008.

Tool Report: HPjmeter: Java Performance Tuning. Published Aug. 2002. http://www.javaperformancetuning.com/tools/hpjmeter/index.shtml.

Intrinsic Locks and Synchronization. http://java.sun.com/docs/books/tutorial/essential/concurrency/locksync.html. (last updated Feb. 14, 2008.

Jeff Friesen. "Java Tech: The ABCs of Synchronization, Part I." http://today.java.net/lpt/a/114. Aug. 2, 2004.

Christopher Keene. "An Ounce of Prevention: Avoid J2EE Data Layer Bottlenecks." JavaWorld.com. Apr. 4, 2004.

Tanuj Vohra. "Runtime Problem Determination with IBM Rational Application Developer." Runtime Analysis and Rational PurifyPlus, IBM. Dec. 15, 2004.

Hari Pulapaka and Boris Vidolov. "Performance: Find Application Bottlenecks with Visual Studio Profiler." Aug. 6, 2008.

* cited by examiner

```
public String getSomeData(){
  String data=null;
  synchronized(mutex){
        data=readDataFromSomeStructure();
        }
        return data;
}
```

FIG. 5A

```
public String getSomeData(){
  String data=null;
      Tracer.monitorEnter(mutex, <class>, "getSomeData", <line number>);
      try{
         synchronized(mutex){
            data=readDataFromSomeStructure();
         }
      }finally{
         Tracer.monitorExit(mutex);
      }
      return data;
}
```

FIG. 5B

SYSTEM AND METHOD OF IMPLEMENTING A CONCURRENCY PROFILER

CROSS REFERENCE TO RELATED APPLICATIONS

Not Applicable.

BACKGROUND

The present invention relates to measuring bottlenecks, and in particular, to measuring bottlenecks in a client-server environment.

Unless otherwise indicated herein, the approaches described in this section are not prior art to the claims in this application and are not admitted to be prior art by inclusion in this section.

The Java™ programming language is a high-level language that may be characterized by all of the following buzzwords: simple, object oriented, distributed, multi-threaded, dynamic, architecture neutral, portable, high performance, robust, and secure. Further details regarding each of these buzzwords can be found in "The Java™ Language Environment" by James Gosling and Henry McGilton.

In the Java™ programming language, source code is first written in plain text files ending with the .java extension. These source files are then compiled into .class files by a Java™ compiler such as javac. A .class file does not contain code that is native to a physical processor; it instead contains bytecodes—the machine language of the Java™ Virtual Machine (Java™ VM). A launcher tool (java.exe or other Java™ runtime environment) then runs the application with an instance of the Java™ VM.

The Java™ VM runs the application by converting the Java™ bytecodes into native instructions that are specific to the actual operating system and processor of the computing device. Since the bytecode is designed to be portable, but the Java™ VM is specific to the actual computing device, the Java™ VM may be modified in order to perform a wider variety of tasks yet still remain compliant with the Java™ standard.

In general, a Java™ program may be provided by a server to a client for execution. In a client-server enterprise environment such as that provided by the Java™ Enterprise Edition, the server may also execute a Java™ program that communicates with the Java™ program executed by the client, and that interfaces with database applications executed by the server. These Java™ programs may involve bottlenecks as the client accesses information stored by the server. For example, a bottleneck may be created at the server when the server locks data being accessed by the client. The delays these bottlenecks cause may be increased as the Java™ program is executed by multiple clients.

One way to measure bottlenecks is as follows. First, a high load is provided to the server. This helps to identify bottlenecks resulting from scalability issues. Second, the software is executed and the realized wait times are measured. Third, the bottlenecks are identified and addressed. Fourth, the steps of execution, measurement, identification and addressing are iteratively performed to identify further bottlenecks, since some bottlenecks may hide others.

In the above manner, many existing systems serially detect and remove bottlenecks.

Furthermore, bottlenecks are not confined to Java™ language implementations. Bottlenecks may be present in other distributed computing environments where access is coordinated to maintain data integrity.

SUMMARY

Embodiments of the present invention improve the performance of a hardware client-server environment. In one embodiment the present invention includes a computer-implemented method of measuring bottlenecks in a computer program implemented in a hardware client-server environment. The method includes defining an execution parameter to measure of the hardware client-server environment. The method further includes modifying code blocks to include instrumentation code. The instrumentation code relates to the execution parameter. The method further includes executing, in the hardware client-server environment, the code blocks having been modified. The method further includes generating instrumentation data, related to the execution parameter, that result from executing the code blocks. The method further includes outputting the instrumentation data having been generated.

In this manner, the bottlenecks may be measured; the measured bottlenecks may be sorted; noteworthy bottlenecks may be identified; and the aspects of the hardware client-server environment may be adjusted to address the bottlenecks. Sorting is helpful because thousands of synchronization points may be detected and measured, but many of them do not represent a problem that requires correction.

The following detailed description and accompanying drawings provide a better understanding of the nature and advantages of the present invention.

BRIEF DESCRIPTION OF THE DRAWINGS

FIGS. 5A-5B illustrate an example of code block modification according to an embodiment of the present invention.

DETAILED DESCRIPTION

Described herein are techniques for identifying bottlenecks in computer programs. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In general, web servers are designed to handle multiple requests in parallel. Ideally no server would serialize the requests one after the other. However, some components of the server need synchronization (e.g., data storage units), so the server synchronizes these requests and causes synchronized code segments to wait on each other. Such a critical section is referred to as a "bottleneck". When two requests want to enter such a section, only one of them enters, and the other is waiting. If further requests arrive, they wait as well. This may be referred to as the "waiting time" for a single request (or single routine). Furthermore, if a critical section is inside another critical section (referred to as "nesting"), then no request would wait upon the internal section, thus is remains "hidden". Any other nested critical sections would likewise remain hidden.

Figure 1A:
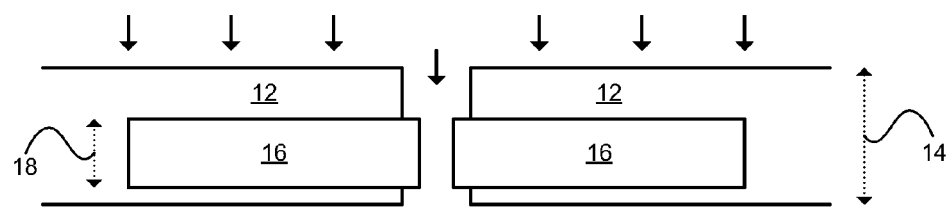
FIGS. 1A-1B illustrate how a bottleneck can hide another bottleneck.
Figure 1B:
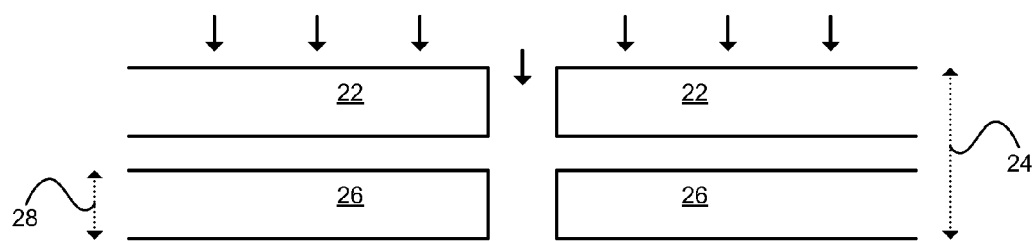
Figure 7A:
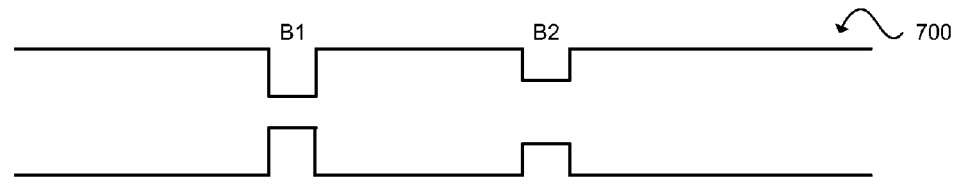
FIGS. 7A-7C illustrate how bottlenecks may be detected and removed in computer program systems.
Figure 7B:
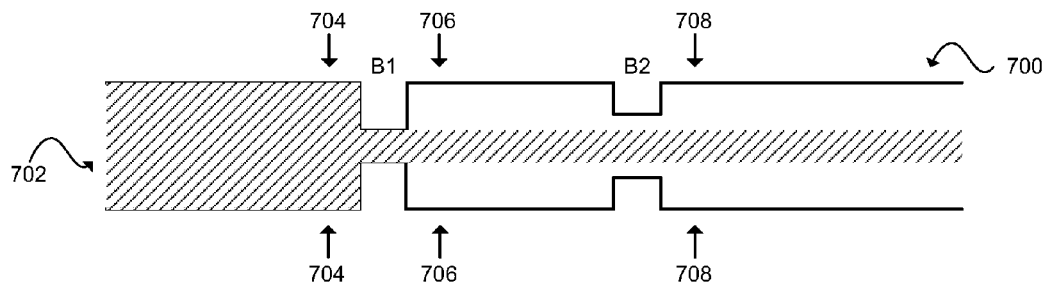
Figure 7C:
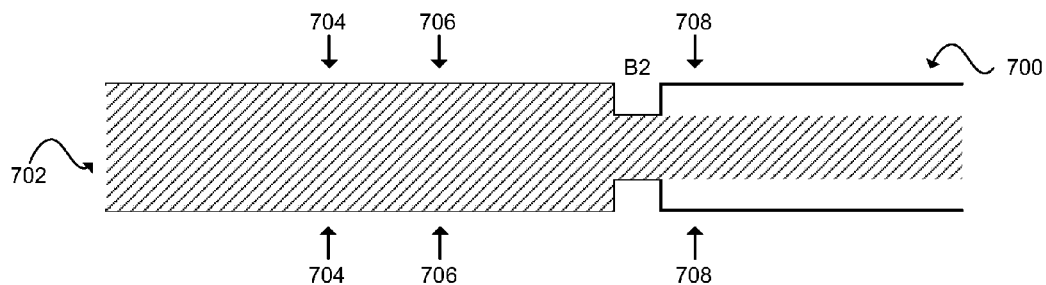

FIGS. 1A-1B illustrate how a bottleneck can hide another bottleneck. FIG. 1A illustrates bottleneck hiding and FIG. 1B illustrates bottleneck serialization. The arrows represent sub-processes running in parallel, for example, Java™ threads; they may correspond to client requests processed by the server. In FIG. 1A, the bottleneck 12 results in a wait time 14, and the bottleneck 16 results in a wait time 18. The bottleneck 12 hides the bottleneck 16. The bottleneck 16 is not apparent until the bottleneck 12 has been identified and addressed. In FIG. 1B, the bottleneck 22 results in a wait time 24, and the bottleneck 26 results in a wait time 28. The bottleneck 22 serializes the routines so that the bottleneck 26 is not related to any concurrency effects such as wait time and contention. Once the bottleneck 22 has been identified and addressed, the wait time 28 of the bottleneck 26 can be identified and addressed. FIGS. 7A-7C provide more details regarding bottleneck serialization.

FIGS. 7A-7C illustrate how bottlenecks may be detected and removed in computer program systems. FIG. 7A illustrates a processing flow 700 in a computer program system that can be visualized as a pipe. The processing flow 700 has two bottlenecks B1 and B2. The bottlenecks B1 and B2 may correspond to computer program synchronization points.

FIG. 7B illustrates that a high processing load 702 is applied into the processing flow 700. The bottleneck B1 constrains the processing load 702. The bottleneck B1 is detected by measuring the processing flow 700 at point 704 and at point 706, and noting the difference. Notice that the bottleneck B2 may not be detected because there is no difference between the processing flow at point 706 and point 708.

FIG. 7C illustrates the processing flow 700 after the bottleneck B1 has been detected and removed (compare to FIG. 7B). Again, the high processing load 702 is applied to the processing flow 700, and now the bottleneck B2 constrains the processing load 702. The bottleneck B2 is detected by noting the difference between the processing flow at point 706 and point 708.

Figure 2:
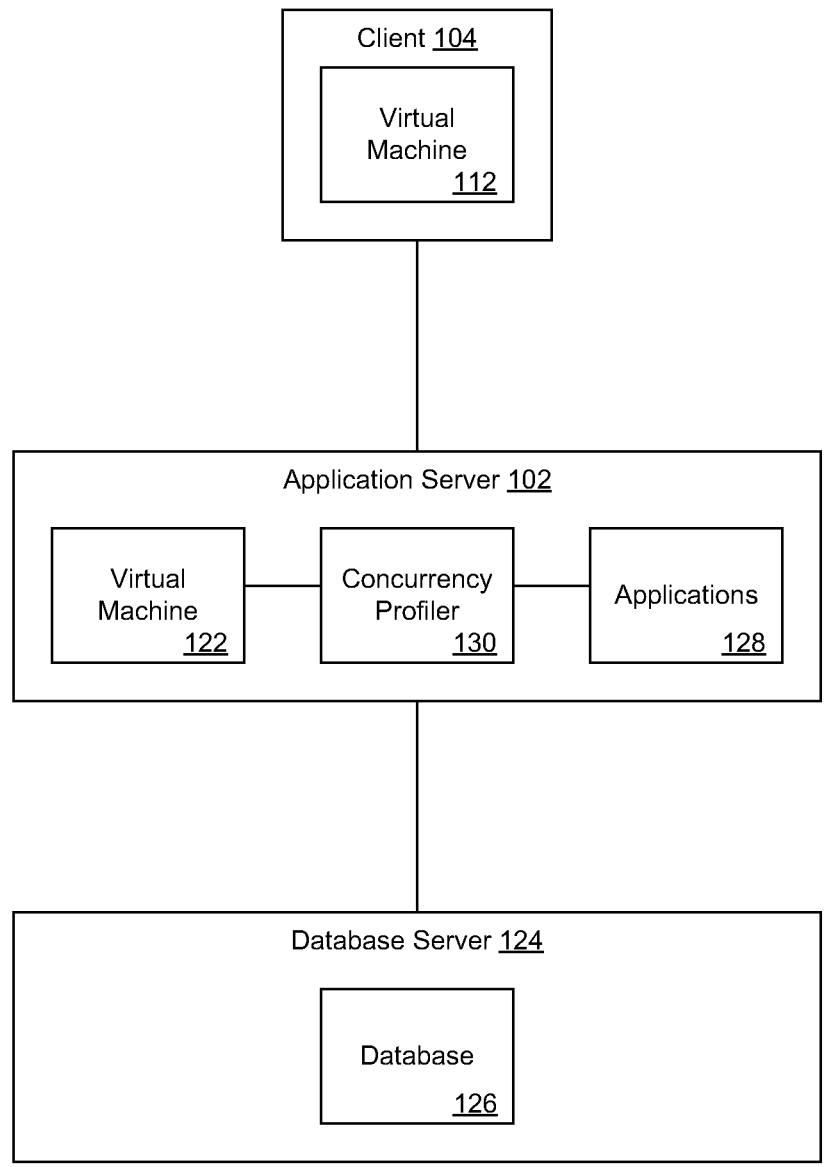
FIG. 2 is a block diagram of a client-server environment according to an embodiment of the present invention.

FIG. 2 is a block diagram of a client-server environment 100 according to an embodiment of the present invention. The client-server environment 100 includes an application server 102, a client 104 and a database server 124 connected via a network. The client-server environment 100 may be described as a "three-tier architecture". The client-server environment 100 may implement the Java™ Enterprise Edition. More specific hardware details of the client-server environment 100 may be seen in FIG. 6.

The network may be a local area network, a wide area network, or another type of network, such as the internet.

The client 104 implements a virtual machine 112. The virtual machine 112 may be a Java™ virtual machine that executes Java™ programs that the client 104 receives from the application server 102. The client may implement the "presentation tier" of the three-tier architecture. More than one client 104 may be present.

The application server 102 implements a virtual machine 122, applications (computer programs) 128, and a concurrency profiler 130. The virtual machine 122 executes the applications 128 (which may be modified by the concurrency profiler 130 as detailed below). The virtual machine 122 may be a Java™ virtual machine that executes Java™ programs. One or more of the computer programs 128 may be provided to the client 104 for execution. The computer programs 128 may be Java™ programs. The application server 102 may implement the "application tier" of the three-tier architecture. More than one application server 102 may be present.

The database server 124 implements a database 126. The database 126 stores the underlying data that is queried, added, deleted, etc. The database server 124 may implement the "data tier" of the three-tier architecture. More than one database server 124 may be present.

In everyday operation of the client-server environment 100, the concurrency profiler 130 may be omitted. An example of everyday operation is as follows. The database 126 stores accounting data. The database server 124 interfaces between the database 126 and other hardware or user interface components, for example, to add data to the database 126, to send queries or other data manipulations to the database 126, to extract information from the database 126 for display or reporting, etc. The virtual machine 122 interfaces between the database server 124 and the client 104, for example, to execute programs that receive data from the client 104 to be added to the database 126, that receive requests for data manipulation from the client 104, or that send extracted information to the client 104 for display, etc. These actions of the virtual machine 122 are controlled by executing the computer programs 128. These actions of the virtual machine 122 may encounter bottlenecks.

The concurrency profiler 130 may be implemented in the application server 102 to detect the bottlenecks that result when the virtual machine 122 executes the computer programs 128. These bottlenecks may result from data locks when interacting with the database server 124 or accessing the database 126. In a client-server environment, these bottlenecks may also result from interaction with the client 104. Further details of the concurrency profiler 130 are provided below.

Figure 3:
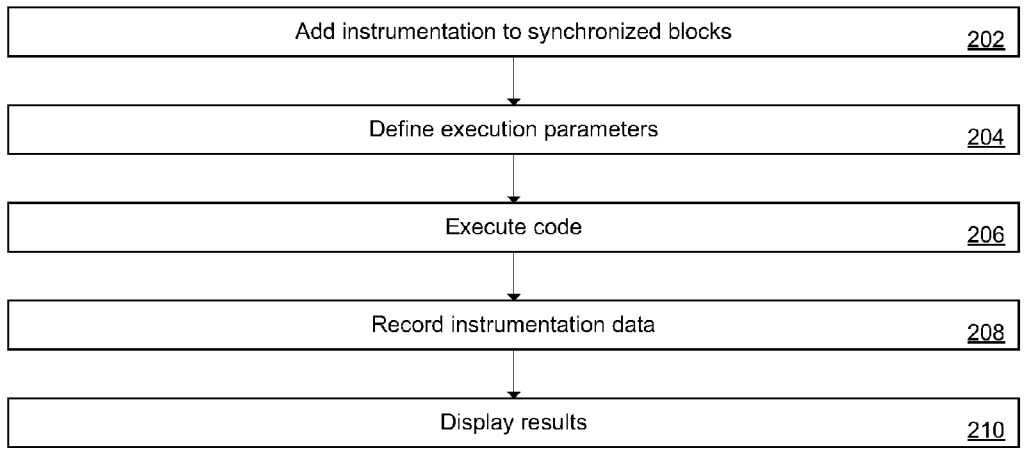
FIG. 3 is a flowchart of a process of measuring bottlenecks according to an embodiment of the present invention.

FIG. 3 is a flowchart of a process 200 of measuring bottlenecks according to an embodiment of the present invention. The process 200 may be implemented by the concurrency profiler 130. The concurrency profiler 130 may execute a computer program to implement the process 200. The computer program may be stored with the computer programs 128. The computer program that implements the process 200 may be written in the Java™ language.

In step 202, one or more execution parameters are defined for measurement. The execution parameters relate to the computer programs 128 that the application server 102 executes. The execution parameters may include parallelism, throughput, through time, limit throughput, and utilization parameters. The execution parameters are related to bottlenecks in the computer programs 128. The execution parameters are discussed in more detail below.

In step 204, the computer programs to be evaluated for bottlenecks are modified to include instrumentation code. The computer programs include code blocks such as applets, classes, functions, procedures, methods, objects, interfaces, variables, etc. The instrumentation code is added to one or more code blocks so that the execution parameters may be measured for that code block.

In step 206, the modified code blocks are executed. When implemented by the application server 102, the concurrency profiler 130 provides the modified code blocks to the virtual machine 122 for execution.

In step 208, as the modified code blocks are executed in step 206, instrumentation data is generated. The instrumentation data corresponds to the execution parameters and results from executing the modified code blocks. The instrumentation data may include information related to each bottleneck such as a location identifier, a thread identifier, a monitor identifier, an enter time, and an exit time. The instrumentation data may include performance information such as a throughput measurement, a through time measurement, a limit throughput measurement, and a utilization measurement.

In step 210, the instrumentation data is outputted. According to one embodiment, the concurrency profiler 130 instructs the virtual machine 122 to send the instrumentation data to the client 104, and the virtual machine 112 instructs the client 104 to display the instrumentation data for perusal by a user. The instrumentation data may be sorted or otherwise displayed in decreasing order by a parameter such as the utilization measurement so that important bottlenecks may be easily identified for correction or removal.

Further details regarding the client-server environment 100, the concurrency profiler 130, and the process 200 are provided below.

Software Bottlenecks

As discussed above, a bottleneck results in a lessening of throughput. In computer programs, bottlenecks are typically caused by synchronization points between different routines. These bottlenecks are dangerous because they represent a logical limitation that cannot be solved by adding new hardware.

Examples of computer program bottlenecks include concurrency locks and resource limits. Concurrency locks are used in different routines in order to prevent concurrency problems. An example is setting an exclusive (write) lock on a file before modifying the file, and setting a shared (read) lock on a file before reading the file. Resource limits are when multiple routines acquire a resource from a limited set of resources. An example is a program that keeps a set of ten database connections. The program can serve multiple clients in parallel, but a maximum of ten clients can use the connection at one point in time.

According to an embodiment of the present invention, scalability problems are analyzed at low load. Large, expensive hardware is not required.

According to an embodiment of the present invention, all possible bottlenecks are listed. None are hidden.

According to an embodiment of the present invention, the bottlenecks are measured and sorted in order from most significant bottleneck to least significant bottleneck.

Figure 8A:
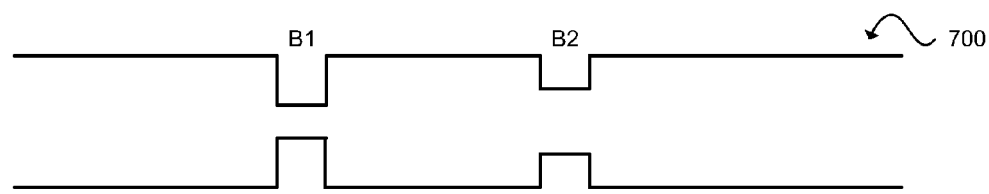
FIGS. 8A-8B illustrate how bottlenecks are measured according to an embodiment of the present invention.
Figure 8B:
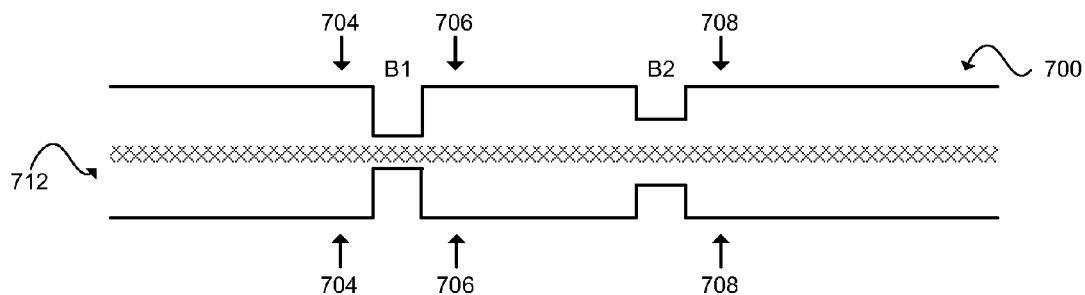

FIGS. 8A-8B illustrate how bottlenecks are measured according to an embodiment of the present invention. FIG. 8A is the same as FIG. 7A, showing the processing flow 700 and the bottlenecks B1 and B2. FIG. 8B shows a low processing load 712. As an example, the low processing load 712 may be a single routine executing through the computer program. The single routine may then be used to trace the bottlenecks and describe their metrics. One metric is the number of routines that can pass through a bottleneck at one time. Another metric is the time needed for the single routine to pass through a bottleneck. The metrics are described in more detail below.

Defining Bottleneck Metrics

Consider the following example. A small web server has one database connection. Many parallel requests do the following: 1. Obtain an explicit lock (a request may wait here). 2. Get the connection. 3. Execute a database command, e.g., SQL (structured query language) operation, for approximately 0.05 seconds. 4. Release the explicit lock.

Assuming a load at a rate of seven requests per second, the following calculations result. Each operation takes 0.05 seconds so a maximum of 20 operations per second may be performed (1/0.05=20). The current load is seven operations per second, so the bottleneck is "utilized" at 35%. If the load reaches the maximum of 20 operations per second, the utilization becomes 100%.

The following metrics are defined: parallelism [P], throughput [T], through time [$\Delta$t], limit throughput [$\mu$t], and utilization [U].

Parallelism [P] is the maximum number of routines that can run inside the bottleneck. The metric is implied from the computer program logic and does not necessarily depend on the hardware or the load. In the example above, [P]=1 since only one request may work with the connection at one point in time. If we have N connections, the parallelism would be equal to N. Thus, the parallelism does not depend upon the load, but on the bottleneck design.

Throughput [T] is the number of operations per second—how many routines pass through the bottleneck per second. This metric depends upon the load. Normally we expect doubled throughput from a doubled load.

Through time [$\Delta$t] is the time needed for one routine to pass through the bottleneck. According to an embodiment, the through time is measured in a non-concurrency environment (i.e., one routine). This allows a "clean" through time measurement, without including concurrency side effects like wait times. According to an embodiment, a low load is used when operating the concurrency profiler 130.

Limit throughput [$\mu$t] is the maximum number of operations that may be performed in a specific time (e.g., the maximum number of operations per second). The limit throughput is derived from the through time, as follows:

$$[\mu T] = [P]/[\Delta t]$$

In the example above, [$\mu$t]=1/0.05=20 operations per second.

Utilization [U] is the ratio between the throughput (measured) and the limit throughput, as follows:

$$[U] = [T]/[\mu T]$$

In the example above, [U]=7/20=35%. Since the throughput cannot be larger than the limit throughput, $$0 \leq [U] \leq 1$$

Figure 4:
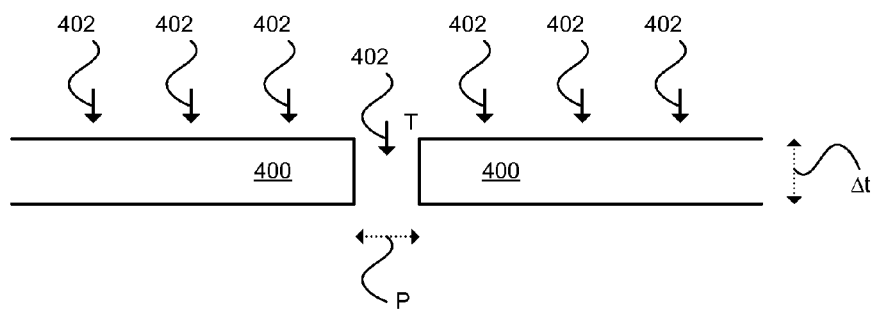
FIG. 4 illustrates bottleneck metrics according to an embodiment of the present invention.

FIG. 4 illustrates these bottleneck metrics. The through time [$\Delta$t] is represented by the height of the bottleneck 400. The parallelism [P] is represented by the width between parts of the bottleneck 400. The throughput [T] is represented by the routines (arrows 402) passing through the bottleneck 400.

According to an embodiment, the concurrency profiler 130 measures the metrics defined above in order to calculate the utilization of as many as all the bottlenecks presented. The concurrency profiler 130 instruments each code block and records one or more of the following information:

Location: This is the class, method, and line number of the bottleneck.

Thread: This is the thread identifier (routine identifier).

Monitor: This is the resource that the routines are fighting for (e.g., a synchronization monitor or lock).

Enter time: This is the time that the thread enters the bottleneck.

Exit time: This is the time that the thread exits the bottleneck.

The instrumentation of the computer program may be performed via bytecode modification. According to an embodiment where the concurrency profiler 130 is measuring Java™ programs, synchronized code blocks may be modified, as shown in FIGS. 5A-5B.

FIGS. 5A-5B illustrate an example of code block modification according to an embodiment of the present invention. FIG. 5A shows the code block prior to modification, and FIG. 5B shows the code block after modification. In a Java™ implementation, the monitor enter and monitor exit commands may be used by the Java™ synchronized statement to coordinate access to an object among multiple threads. Since each thread is writing its own trace file, any contention that may be caused by the concurrency profiler 130 is avoided.

EXAMPLE

An embodiment of the concurrency profiler 130 was used to find bottlenecks in the SPECjAppServer benchmark application, to enhance scalability. (For example, with perfect scalability, doubling the hardware parameters doubles the load capability. The presence of bottlenecks is a barrier to perfect scalability, so identifying and removing bottlenecks improves scalability.) The concurrency profiler 130 transformed all binaries of the Java™ server installation, which was approximately 350 .jar files. A valid run was executed with transaction rate 5 (50 HTTP [hypertext transfer protocol] clients and 15 RMI [remote method invocation] clients). (These parameters are load test parameters that show the load executed, for example, corresponding to number of client computers.) The concurrency profiler 130 generated a report for which TABLE 1 summarizes the top level of information.

TABLE 1

| Location | Throughput/s | Through Time (ms) | Limit Throughput/s | Utilization % |
|---|---|---|---|---|
| com/sap/jms/client/connection/RemoteAdapter.sendAndWait.14 | 48.318 | 19.05596738 | 52.477 | 92.07 |
| erverSessionPool.getServerSession.10 | 14.813 | 62.13881812 | 16.093 | 92.04 |
| com/sap/tc/logging/Log.getEffectiveSeverity.228 | 97.712 | 3.246753247 | 308 | 31.72 |
| com/sap/jms/server/dc/consumer/Consumer.redeliver.288 | 27.711 | 6.248281723 | 160.044 | 13.57 |
| com/sap/jms/server/dc/DeliveryTask.execute.6 | 15.443 | 8.099133393 | 123.47 | 12.51 |
| com/sap/engine/session/state/SessionRequest.getSession.20 | 98.592 | 1.153469058 | 866.95 | 11.37 |
| com/sap/engine/services/connector/jca/ConnectionHashSet.match.97 | 240.346 | 0.246410416 | 4058.27 | 5.92 |

With the information in the report (e.g., TABLE 1), a configuration expert may then determine what aspects of the application server 102 may be involved in the bottlenecks, and may adjust these aspects to improve performance. The aspects that may be adjusted broadly include configuration problems, programming inefficiencies, etc. More specifically, the configuration expert may adjust the hardware components used to implement the application server 102, the programming of the computer programs executed by the application server 102, the configuration of the virtual machine 122, the programming of the computer programs executed by the database server 124, the programming of the Java Database Connectivity (JDBC) API drivers, the configuration of the network, etc.

As discussed above, the code blocks are instrumented, and the performance measurement is executed using (for example) one request/routine (referred to as a "tracing routine"). Such a tracing routine does not require a high load on the system components. The bottlenecks are measured according to the measurement metrics set forth above. Once the bottlenecks are measured, they may be sorted in order to identify the most important bottlenecks. Then the configuration expert may, if desired, concentrate on addressing the important bottlenecks, so that a given amount of effort achieves the greatest results.

Figure 6:
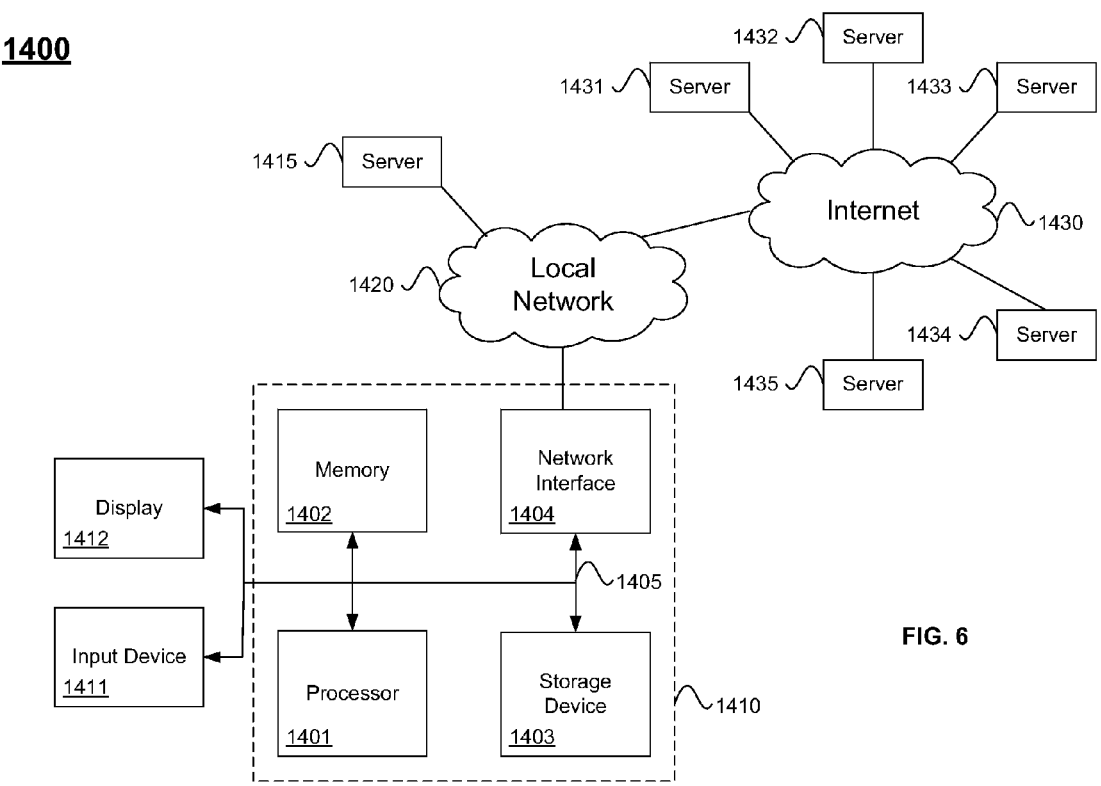
FIG. 6 is a block diagram of an example computer system and network 1400 for implementing embodiments of the present invention.

FIG. 6 is a block diagram of an example computer system and network 1400 for implementing embodiments of the present invention. Computer system 1410 includes a bus 1405 or other communication mechanism for communicating information, and a processor 1401 coupled with bus 1405 for processing information. Computer system 1410 also includes a memory 1402 coupled to bus 1405 for storing information and instructions to be executed by processor 1401, including information and instructions for performing the techniques described above. This memory may also be used for storing temporary variables or other intermediate information during execution of instructions to be executed by processor 1401. Possible implementations of this memory may be, but are not limited to, random access memory (RAM), read only memory (ROM), or both. A storage device 1403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1403 may include source code, binary code, or software files for performing the techniques or embodying the constructs above, for example.

Computer system 1410 may be coupled via bus 1405 to a display 1412, such as a cathode ray tube (CRT) or liquid crystal display (LCD), for displaying information to a computer user. An input device 1411 such as a keyboard and/or mouse is coupled to bus 1405 for communicating information and command selections from the user to processor 1401. The combination of these components allows the user to communicate with the system. In some systems, bus 1405 may be divided into multiple specialized buses.

Computer system 1410 also includes a network interface 1404 coupled with bus 1405. Network interface 1404 may provide two-way data communication between computer system 1410 and the local network 1420. The network interface 1404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1404 sends and receives electrical, electromagnetic, or optical signals that carry digital data streams representing various types of information.

Computer system 1410 can send and receive information, including messages or other interface actions, through the network interface 1404 to an Intranet or the Internet 1430. In the Internet example, software components or services may reside on multiple different computer systems 1410 or servers 1431, 1432, 1433, 1434 and 1435 across the network. A server 1431 may transmit actions or messages from one component, through Internet 1430, local network 1420, and network interface 1404 to a component on computer system 1410.

The computer system and network 1400 may be the hardware used to implement the application server 102, the client 104 and the database server 124.

Although the above description has focused on the Java™ environment, similar embodiments may be implemented to identify and measure bottlenecks in other distributed computing environments, including an ABAP™ environment, a C# environment, a .NET™ environment, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of measuring bottlenecks in a computer program implemented in a hardware client-server environment, comprising:
    defining an execution parameter of the hardware client-server environment to measure, wherein the execution parameter relates to the bottlenecks in the computer program implemented in the hardware client-server environment, wherein the execution parameter includes at least one of a parallelism parameter, a throughput parameter, a limit throughput parameter, and a utilization parameter, and wherein the utilization parameter is a ratio between the throughput parameter and the limit throughput parameter;
    modifying each code block of a plurality of code blocks to include instrumentation code, wherein the instrumentation code relates to the execution parameter;
    executing, in the hardware client-server environment, each code block of the plurality of code blocks having been modified;
    generating instrumentation data, related to the execution parameter, that resulted from executing each code block of the plurality of code blocks having been modified; and
    outputting the instrumentation data having been generated.

2. The computer-implemented method of claim 1, wherein the computer program is a first computer program executed by a hardware server computer that accesses information stored by the hardware server computer, and that interacts with a second computer program executed by a hardware client computer.

3. The computer-implemented method of claim 1, wherein the computer program is a first computer program executed by a hardware application server that interacts with a hardware database server, and that interacts with a second computer program executed by a hardware client computer.

4. The computer-implemented method of claim 1, wherein modifying each code block of a plurality of code blocks comprises:
    identifying a synchronized code block of the plurality of code blocks;
    adding a monitor entry command at a beginning of the synchronized code block; and
    adding a monitor exit command at an end of the synchronized code block.

5. The computer-implemented method of claim 1, wherein each code block of the plurality of code blocks having been modified are executed according to a hardware server computer having a low load.

6. The computer-implemented method of claim 1, wherein executing each code block of the plurality of code blocks having been modified comprises:
    obtaining a lock on information stored in a database implemented by a hardware database server computer;
    getting a connection to the database;
    executing a database command that accesses the information; and
    releasing the lock.

7. The computer-implemented method of claim 1, wherein the instrumentation data includes at least one of a location identifier, a thread identifier, a monitor identifier, an enter time, and an exit time.

8. The computer-implemented method of claim 1, wherein the instrumentation data includes at least one of a location identifier, a throughput measurement, a through time measurement, a limit throughput measurement, and a utilization measurement.

9. The computer-implemented method of claim 1, wherein the instrumentation data is outputted according to a utilization measurement in a decreasing order.

10. The computer-implemented method of claim 1, further comprising:
    adjusting an aspect of the hardware client-server environment according to a user input in response to outputting the instrumentation data having been generated.

11. The computer-implemented method of claim 1, further comprising:
    adjusting an aspect of a hardware application server in the hardware client-server environment according to a user input in response to outputting the instrumentation data having been generated.

12. The computer-implemented method of claim 1, further comprising:
    adjusting an aspect of a virtual machine in a hardware application server in the hardware client-server environment according to a user input in response to outputting the instrumentation data having been generated.

13. The computer-implemented method of claim 1, wherein executing each code block of the plurality of code blocks having been modified comprises:
    obtaining a shared lock on information stored in a database implemented by a hardware database server computer;
    getting a connection to the database;
    executing a database command that accesses the information; and
    releasing the shared lock.

14. An apparatus that executes instructions for measuring bottlenecks in a computer program implemented in a hardware client-server environment, the apparatus comprising:
    a memory that stores a plurality of code blocks; and
    a processor that performs processing including:
        defining an execution parameter of the hardware client-server environment to measure, wherein the execution parameter relates to the bottlenecks in the computer program implemented in the hardware client-server environment, wherein the execution parameter includes at least one of a parallelism parameter, a throughput parameter, a limit throughput parameter, and a utilization parameter, and wherein the utilization parameter is a ratio between the throughput parameter and the limit throughput parameter, modifying each code block of the plurality of code blocks to include instrumentation code, wherein the instrumentation code relates to the execution parameter, executing, in the hardware client-server environment, each code block of the plurality of code blocks having been modified, generating instrumentation data, related to the execution parameter, that resulted from executing each code block of the plurality of code blocks having been modified, and outputting the instrumentation data having been generated.

15. The apparatus of claim 14, wherein the processor performs processing further comprising:
implementing a virtual machine, wherein the virtual machine executes each code block of the plurality of code blocks having been modified.

16. The apparatus of claim 14, wherein the processor performs processing further comprising:
implementing a virtual machine, wherein the virtual machine executes each code block of the plurality of code blocks having been modified; and
adjusting an aspect of the virtual machine according to a user input in response to outputting the instrumentation data having been generated.

17. The apparatus of claim 14, wherein the instrumentation data is outputted according to a utilization measurement in a decreasing order.

18. A non-transitory computer-readable medium having recorded thereon instructions that control a data processing apparatus to execute processing for measuring bottlenecks in a computer program implemented in a hardware client-server environment, comprising:
defining an execution parameter of the hardware client-server environment to measure, wherein the execution parameter relates to the bottlenecks in the computer program implemented in the hardware client-server environment, wherein the execution parameter includes at least one of a parallelism parameter, a throughput parameter, a limit throughput parameter, and a utilization parameter, and wherein the utilization parameter is a ratio between the throughput parameter and the limit throughput parameter;

modifying each code block of a plurality of code blocks to include instrumentation code, wherein the instrumentation code relates to the execution parameter;

executing, in the hardware client-server environment, each code block of the plurality of code blocks having been modified;

generating instrumentation data, related to the execution parameter, that resulted from executing each code block of the plurality of code blocks having been modified; and outputting the instrumentation data having been generated.

19. The non-transitory computer-readable medium of claim 18, wherein the instructions control the data processing apparatus to execute processing further comprising:
implementing a virtual machine, wherein the virtual machine executes each code block of the plurality of code blocks having been modified.

20. The non-transitory computer-readable medium of claim 18, wherein the instructions control the data processing apparatus to execute processing further comprising:
implementing a virtual machine, wherein the virtual machine executes each code block of the plurality of code blocks having been modified; and
adjusting an aspect of the virtual machine according to a user input in response to outputting the instrumentation data having been generated.

* * * * *